Patented Dec. 31, 1935

2,026,064

UNITED STATES PATENT OFFICE 2,026,064

HIGH SILICA CEMENT

Edward W. Rice, Santa Cruz, Calif., assignor to Santa Cruz Portland Cement Company, San Francisco, Calif., a corporation of California No Drawing. Application September 23, 1932, Serial No. 634,566

2 Claims. (Cl. 106—24)

This invention relates to the manufacture of what may be termed a high silica Portland cement, of the type described in my co-pending patent application filed under Serial No. 587,157, (issued as Patent No. 1,907,003, May 2, 1933) and it has for its objects a simplification of the process of making such cement, a more uniform product, and a lower cost of production.

In the co-pending case there was an addition made to normal Portland cement clinker consisting of calcined shale and lime in certain proportions, both ground with the clinker to a very fine condition, to a degree so that the silica addition was in shape for immediate reaction with the added lime upon gaging the combination cement with water in mixing concrete, the reaction being promoted, it was thought, by the "seed crystals" of calcium silicate supplied at once by the Portland cement reaction.

The ultimate purpose of the combination is to secure a concrete in which there is substantially no free lime, the lime gradually liberated by the Portland cement reaction slowly entering into combination with the silica along with the reaction started by the active lime-silica addition to the clinker, and which reaction the normal free lime of the Portland cement content seems unable to initiate with silica alone, owing, it is thought, to this lime originally being so mechanically interlocked in the clinker particles so as to make it not readily available in a reasonable period of time.

However, further experiments with this high silica Portland cement have shown that it may be made directly by using low grade cement materials simply calcined and added to normal clinker before grinding. By this improvement the necessity of purchasing or manufacturing commercial lime, and the separate calcining of shale or other siliceous material is entirely avoided.

In carrying out the process low grade cement rock containing about a 15% CaO content, or raw limestone and raw siliceous material, such as a shale of high silica content, mixed to contain about the above proportion of CaO, so that after calcining there will be a content of about 20% CaO and 80% siliceous material, has been found to be the best for the type of raw materials which I am using. The figure of 15% CaO required in raw combination to obtain 20% CaO in calcine is variable, depending upon ignition loss due to other volatiles than $CO_2$, as $H_2O$ and organic contents.

The proportions are therefore subject to variation according to analysis of the siliceous material and also to the degree of fineness to which said siliceous material is pulverized in the final cement, as upon this depends, to a great extent, its degree of availability to combine chemically with the lime.

It is my practice to reduce this limestone-siliceous material mix to 8-mesh size before calcination, and then pass it through a calcining kiln at such a temperature that when discharged, the limestone will be practicaly all decarbonated. With sufficiently long residence in the kiln when using this size material a minimum temperature of 1,000° F. is sufficient to produce substantially complete calcination. A higher temperature may be used, but the maximum temperature allowable must be below that which will start fusion or clinkering of the materials.

This process may be carried out with any reasonable sized materials, but for best and uniform results I prefer a maximum size of 8-mesh.

It is perfectly feasible, but not advantageous, to calcine the material at a finer size, for instance, the process could be followed by taking ordinary raw cement material which contains 43.4% CaO and is ground to 91% minus 200-mesh. This material, if mixed in such a proportion with siliceous material as to make a lime content of approximately 15%, could be calcined to a compound containing the proportions of lime 20% and siliceous material 80%. This is mentioned because in some cases it might be more feasible to calcine a material of this size and it could be handled in a regular Portland cement plant using either the wet or dry process.

A suitable siliceous material for diluting an over rich limestone I have found to be Monterey shale which, when calcined, runs from about 80 to 84% silica, about 8 to 11% alumina, about 7 or 8% iron oxide, and about 1% lime and magnesia, though other shales and materials containing the required silica, may be used by adjusting the proportions of the admixture to obtain the desired relation of elements as previously outlined. The amount of clay contained, though small in the case of Monterey shale, seems important in securing the full advantages of the compound cement. This also holds good for the iron content, which also controls the color of the cement.

Regardless of size of raw material used, the burning is carried to calcination only and not to fusion or clinkering, thereby producing the active compound for combination with any desired proportion of Portland cement clinker, as described in my above mentioned pending patent application.

Actually the limestone content requires a higher temperature for calcination than does the siliceous material, but it has been found that the optimum temperature for each constituent can be satisfied when burned simultaneously, provided the size material and residence in kiln are properly controlled, as indicated above.

In making the complete cement, the best results, or product meeting the general requirements in concrete construction at the present time, are found to be obtained by mixing about 30%, by weight, of the above calcined material with 70% normal Portland cement clinker, together with the usual small amount of gypsum to control set as desired, and grinding the mixed materials to an extremely fine condition, preferably so that about 95% will pass a 200-mesh, as the finer it is ground the more marked are the advantages of the combination.

For a cement of a quicker high early strength at some sacrifice of workability, a somewhat higher percentage of clinker may be used, while for very massive concrete construction, such as in big dams and the like, a slower hardening low temperature product is had by using a much lower percentage of clinker.

This manner of producing the combined cement or high silica Portland cement, as it may be termed, represents a great improvement on the former process in the following points:

1. It reduces the cost of the calcination process, due to calcining one compound instead of two separate ingredients.

2. The presence of the limestone constituent helps conserve the heat in the kiln, thereby making the process more efficient as to fuel economy. Lime quickly absorbs and holds the heat while the siliceous material is more or less of a heat insulating nature.

3. Uniformity of calcination which determines the color quality of the cement is more easily carried out.

4. Since the raw compound is automatically formulated in the same manner as the raw mix for Portland cement manufacture, one less ingredient must be proportioned when combining with clinker and gypsum to produce the finished hydraulic cement.

The advantages of the completed cement are outstanding over regular Portland cement, the chief features being its lower cost of manufacture, greater plasticity, lower specific gravity, high early and greater ultimate strength, and greater resistance to water, as concrete made with it is practically free from free lime, a fact which contributes to its extraordinary hydraulic qualities.

The outstanding features of the invention are the calcining of a mixture of siliceous material and lime at a temperature below the critical temperature at which they combine to form a silicate of lime, mixing this product with Portland cement clinker and then grinding to cement fineness. This combination I believe to be new and useful in the art.

The words "siliceous material" as used in the claims, are to be liberally construed, as there is no hard line of distinction over argillaceous material where the latter contains sufficient silica in a form to be available to the reaction after calcining.

I therefore claim:—

1. The process of making an hydraulic cement which comprises calcining a mixture of ground raw cement materials containing silica and lime in about a 5 to 1 ratio together with a relatively small proportion of clay and iron oxide, at a temperature from about 1000° F. and upward but below the point of incipient fusion of the mass, to activate the silica while calcining the lime, mixing the calcined material with several times its weight of Portland cement clinker, and grinding the final mixture to Portland cement fineness.

2. The process of making an hydraulic cement which comprises calcining a mixture of ground raw cement materials containing silica and lime in about a 5 to 1 ratio together with a relatively small proportion of clay and iron oxide, at a temperature from about 1000° F. and upward but below the point of incipient fusion of the mass as well as below the critical temperature and time period at which silicates of lime would be formed, so as to activate the silica while calcining the lime, mixing the calcined material with several times its weight of Portland cement clinker, and grinding the final mixture to Portland cement fineness.

EDWARD W. RICE.